(12) United States Patent
Escuti et al.

(10) Patent No.: US 9,335,586 B2
(45) Date of Patent: May 10, 2016

(54) POLARIZATION CONVERSION SYSTEMS WITH POLARIZATION GRATINGS AND RELATED FABRICATION METHODS

(71) Applicant: North Carolina State University, Raleigh, NC (US)

(72) Inventors: Michael J. Escuti, Cary, NC (US); Ravi K. Komanduri, Raleigh, NC (US); Jihwan Kim, Raleigh, NC (US); Kristopher F. Lawler, Jr., Cary, NC (US)

(73) Assignee: North Carolina State University, Raleigh, NC (US)

( * ) Notice: Subject to any disclaimer, the term of this patent is extended or adjusted under 35 U.S.C. 154(b) by 211 days.

(21) Appl. No.: 14/349,929

(22) PCT Filed: Oct. 5, 2012

(86) PCT No.: PCT/US2012/058985
§ 371 (c)(1),
(2) Date: Apr. 4, 2014

(87) PCT Pub. No.: WO2013/052816
PCT Pub. Date: Apr. 11, 2013

(65) Prior Publication Data
US 2014/0285878 A1    Sep. 25, 2014

Related U.S. Application Data

(60) Provisional application No. 61/544,888, filed on Oct. 7, 2011.

(51) Int. Cl.
*G02F 1/13363* (2006.01)
*G02B 5/30* (2006.01)
*G02B 27/28* (2006.01)

(52) U.S. Cl.
CPC .......... *G02F 1/13363* (2013.01); *G02B 5/3083* (2013.01); *G02B 27/286* (2013.01); *Y10T 29/49826* (2015.01); *Y10T 156/10* (2015.01)

(58) Field of Classification Search
CPC .................................................. G06F 1/13363
See application file for complete search history.

(56) References Cited

U.S. PATENT DOCUMENTS

| 6,621,533 | B2 | 9/2003 | Slack et al. |
| 7,810,931 | B2 | 10/2010 | Kawamura et al. |
| 2009/0059367 | A1 | 3/2009 | O'Malley |
| 2010/0245690 | A1* | 9/2010 | Kawamura ........................ 349/9 |
| 2010/0245691 | A1* | 9/2010 | Kawamura ........................ 349/9 |
| 2011/0242656 | A1 | 10/2011 | Seo et al. |

OTHER PUBLICATIONS

International Search Report and Written Opinion for PCT/US12/58985 mailed Dec. 12, 2012.

(Continued)

*Primary Examiner* — Timothy L Rude
(74) *Attorney, Agent, or Firm* — Myers Bigel Sibley, PA

(57) ABSTRACT

A polarization conversion system includes a lens element, a polarization grating comprising a diffractive element having a spatially-varying local optical axis, and a retarder element. The polarization grating is arranged to receive light that is output from the lens element, and the retarder element arranged to receive polarized light of different polarization states that is output from the polarization grating and change the different polarization states to a same polarization state. Related devices and fabrication methods are also discussed.

28 Claims, 10 Drawing Sheets

(56) References Cited

OTHER PUBLICATIONS

International Preliminary Report on Patentability for PCT/US12/58985 mailed Mar. 21, 2014.
Seo et al., "Polarization Conversion System Using a Polymer Polarization Grating", SID 11 Digest, 2011, pp. 540-543.
European Extended Search Report Corresponding to European Patent Application No. 12839110.9; Dated: May 26, 2015; 9 Pages.
Ogiwara et al. "Late-News Paper: PS Polarization Converting Device for LC Projector Using Holographic Polymer-Dispersed LC Films", 1999 SID International Symposium, May 18-20, 1999, San Jose, California.

* cited by examiner

POLARIZATION CONVERSION SYSTEMS WITH POLARIZATION GRATINGS AND RELATED FABRICATION METHODS

CLAIM OF PRIORITY

This application is a 35 U.S.C. §371 national phase application of PCT International Application No. PCT/US2012/058985, filed 5 Oct. 2012, which claims priority under 35 U.S.C. §119 to U.S. Provisional Patent Application No. 61/544,888 entitled "Polarization Conversion Systems With Polarization Gratings And Related Fabrication Methods," filed Oct. 7, 2011, the disclosures of which are incorporated by reference herein in their entireties. PCT International Application No. PCT/2012/058985 is published in English as International Publication No. WO 2013/052816 A1.

FIELD

The present invention relates to polarization conversion and related systems.

BACKGROUND

Many projection display systems and direct-view flat-panel displays use unpolarized light sources (e.g., lamps, light-emitting-diodes (LEDs), ambient light, etc.). However, many devices that employ liquid crystal (LC) materials, including LC on Silicon (LCOS) microdisplays or LC displays (LCD), may require this light to be polarized. While conventional polarizing elements can produce polarized light from unpolarized light (including sheet polarizers or various birefringent prisms) by permitting light of the desired polarization to pass therethrough, they may be inherently inefficient, since they typically operate by either absorbing the unwanted light or redirecting it in an unwanted direction. This can lead to greater than 50% loss of optical efficiency, even before the light enters the opto-electronic component. Such large losses are typically undesirable, especially in high brightness display systems or portable battery-powered display systems where battery life is limited.

Some approaches have been used to improve the conversion efficiency of polarizing elements so that more than 50% of the unpolarized light is converted to polarized light. One such approach recycles the light with the unwanted polarization by reflecting it back into the light source itself, with the expectation that its polarization will be scrambled and subsequently re-emitted with at least some of the desired polarization. Such an approach may preserve the etendue (or extent of spreading) of the light output from the light source, and commonly leads to around 55-70% conversion efficiency. This approach is described, for example, in U.S. Pat. No. 6,025,897 and U.S. patent application Ser. No. 12/154,314.

Another approach to polarization conversion, referred to as a polarization conversion system (PCS), converts the incident light with the unwanted polarization into the desired polarization instead of absorbing or redirecting it from the output, and is described for example in U.S. Pat. No. 5,995,284 and U.S. Pat. No. 6,621,533. For example, one set of elements (such as a fly-eye lens and a refractive polarizing beam splitter (PBS)) may spatially separate the incident light into two different polarizations, and then a subsequent element (such as a louvered half-wave plate) may selectively convert one of these polarizations into the other. While this approach can lead to up to about 60-70% conversion efficiency of unpolarized light into polarized light, this approach doubles the etendue of the light source.

Yet another approach, described in U.S. Pat. No. 7,692,759, uses one or more polarization gratings (PGs) in combination with a mirror, or in combination with a waveplate and micro-prism array, to achieve polarization conversion. However, the former arrangement may require a relatively large volume, while the latter approach may have limited practicality (for example, requiring extremely collimated light). Also, a PCS has been demonstrated that employs a polarization grating placed before a fly-eye-lens, followed by a louvered halfwave plate. However, each element in this configuration is separate, and the elements are aligned separately and mounted together with some external fixture, which can be cumbersome, costly, and can reduce conversion efficiency.

SUMMARY

According to some embodiments described herein, a polarization conversion system includes a lens element, a polarization grating comprising a diffractive element having a spatially-varying local optical axis, and a retarder element. The polarization grating is arranged to receive light that is output from the lens element, and the retarder element is arranged to receive polarized light of different polarization states that is output from the polarization grating and change each of the different polarization states to a same polarization state.

In some embodiments, the lens element may be a lens array having at least two lenslet elements arranged side-by-side in a same plane or coplanar arrangement.

In some embodiments, the polarization grating may be positioned between the lens array and a focal plane thereof, or at or near the focal plane. In some embodiments, the retarder element may be a spatially patterned retardation plate including two or more sets of alternating retardation regions positioned side-by-side in a coplanar arrangement. The alternating retardation regions of the retarder element may be aligned with the respective lenslets of the lens array. For example, the retarder element may be positioned at the focal plane of the lens array and aligned with focal points of the lenslets of the lens array.

In some embodiments, at least two lenslet elements of the lens array may be configured to focus incident light into the respective rays or beams. The polarization grating may be configured to diffract the respective beams output from the lenslet elements into first and second beams to define first and second arrays of focal spots that are interlaced or spatially offset at the focal plane of the lens array. The first and second arrays may partially overlap in some embodiments, but may be non-overlapping in other embodiments. The first and second beams output from the polarization grating may have orthogonal polarization states. The retarder element may be configured to convert the orthogonal polarization states of the first and second beams to a linear polarization state without substantially altering respective directions of propagation thereof.

In some embodiments, the first and second interlaced arrays of focal spots may be defined by orthogonal circularly polarized beams. For example, the first array may be defined by first beams having right-hand circular polarization, and the second array of focal spots may be defined by second beams having left-hand circular polarization. The retarder element may convert the first beams having right-hand circular polarization and the second beams having left-hand circular polarization output from the polarization grating into light beams having linear polarization.

In some embodiments, the louvered retarder may be a quarterwave plate wherein optical axes of the alternating retardation regions are about 90° apart. In some embodiments, the retarder element may include first and second alternating strips or regions that provide quarterwave retardation, where the first strip provides optical retardation of +90°, and the second strip provides an optical retardation of −90° between the two orthogonal components of the electric field in the respective strips. Each set of alternating domains may be aligned with a respective lenslet in a row and/or column of the second lens array.

In some embodiments, the polarized light that is output from the polarization grating includes divergent beams having orthogonal circular polarization states of opposite handedness. The divergent beams that are output from the polarization grating may include greater than about 90% of an intensity of light that is incident on the lens array. The light that is incident on the lens array may have a divergence angle of greater than about ±5°, greater than about ±7°, greater than about ±9°, or greater than about ±11°.

In some embodiments, the polarization conversion system may further include a second lens array having at least two lenslet elements arranged side-by-side in a coplanar arrangement, and positioned to receive light output from the retarder element. The second lens array may be configured to re-collimate the light output from the retarder element. For example, the second lens array may be positioned to receive the light beams having the same polarization state output from the retarder element, and the at least two lenslet elements thereof may be configured to collimate the light beams having the same polarization state to provide substantially linearly polarized light output from the polarization conversion system. The retarder element may be aligned relative to the second lens array such that each set of the alternating domains concentrates light through a same lenslet of the second lens array. In some embodiments, the substantially linearly polarized light output may include about 80% or more (and in some embodiments, 87% or more) light having a desired linear polarization.

In some embodiments, the light output from the polarization conversion system may have an etendue that is about double that of light incident on the first lens array or less.

In some embodiments, the first and second lens arrays may be similar arrays that are arranged with their respective lenslet elements facing opposite directions.

In some embodiments, a transparent spacer element or layer may be positioned between the polarization grating and the retarder element. For example, the spacer layer may be a rigid or semi-rigid glass or polymer layer. Spacer layers may also be positioned between the first lens array and the polarization grating, and/or between the retarder element and the second lens array in some embodiments.

In some embodiments, the first lens array, the polarization grating, the spacer element, the retarder element, and the second lens array may be aligned and laminated to provide a monolithic optical element.

In some embodiments, the retarder element may be a multi-twist retarder including at least one chiral liquid crystal layer, as described in U.S. Provisional Patent Application No. 61/544,936, the disclosure of which is incorporated by reference herein in its entirety. For example, the retarder element may include first and second chiral liquid crystal layers having respective molecular orientations that are rotated by different twist angles over respective thicknesses thereof, where at least one of the twist angles is non-zero.

In some embodiments, the polarization conversion system may further include a monodomain quarterwave retarder positioned between the polarization grating and the louvered retarder. The monodomain quarterwave retarder may be configured to convert the light output from the polarization grating into orthogonal linear polarization states. The louvered retarder may include alternating halfwave and zero retardation regions that are positioned to receive the orthogonal linear polarization states output from the monodomain quarterwave retarder and output a single polarization state.

In some embodiments, the light incident on the lens array may be at least partially collimated. For example, the light incident on the lens array may be collimated within about ±20°, or within about ±10° in some embodiments. In further embodiments, the light incident on the lens array may be collimated within about ±7° to about ±9°. In other embodiments, the light incident on the lens array may be perfectly collimated. In still other embodiments, the light incident on the lens array may be uncollimated.

In some embodiments, a projector system may include a light source configured to output at least partially collimated light that is provided as incident light to the first lens array described herein, a microdisplay positioned and aligned to receive light output from the second lens array described herein, and a projection lens positioned and aligned to receive the light output from the microdisplay as input light.

In some embodiments, a backlight unit may include a light emitting element configured to output unpolarized light as incident light to the first lens array described herein, and a waveguide positioned and aligned to receive the light output from the second lens array. In some embodiments, the backlight may be provided in a direct view display.

In some embodiments, a telecommunications system may include an infrared light source, a collimator positioned and aligned to receive light output by the infrared light source and output collimated light to the lens element described herein, and an optical element configured to receive the light output from the retarder element described herein.

According to further embodiments described herein, a method of fabricating a polarization conversion system includes arranging a polarization grating comprising a diffractive element having a spatially-varying uniaxial birefringence to receive light that is output from a lens element, and arranging a retarder element to receive polarized light of different polarization states that is output from the polarization grating and change each of the different polarization states to a same polarization state.

Other devices and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1A:
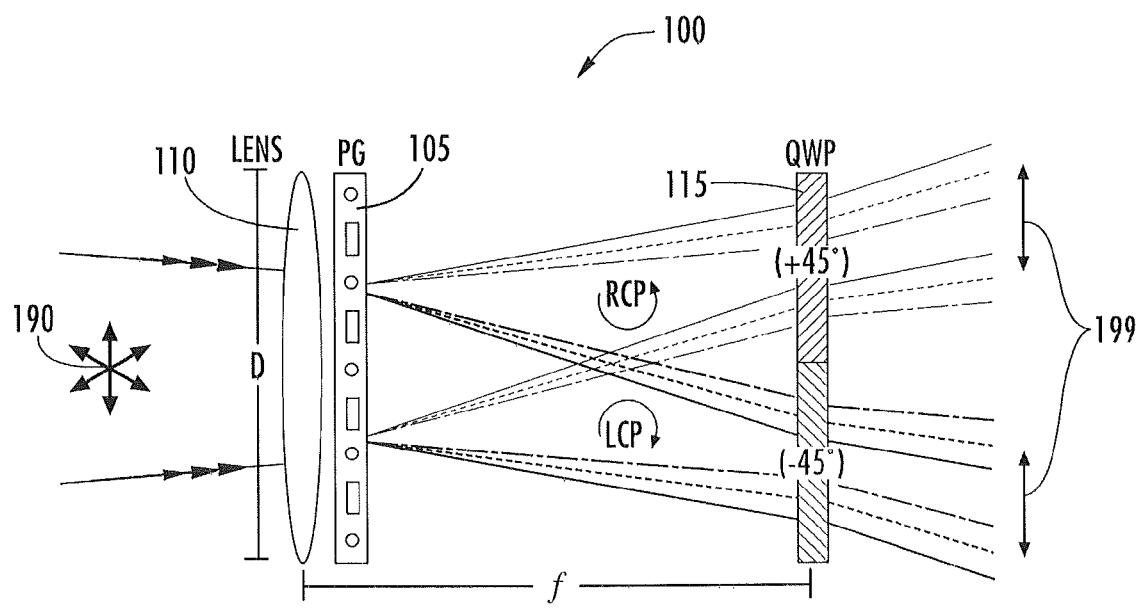
FIG. 1A is a schematic diagram illustrating polarization conversion in accordance with embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Some embodiments of the present invention are described herein with reference to liquid crystal (LC) materials and their use in fabricating polarization gratings. Liquid crystals may include liquids in which an ordered arrangement of molecules exists. Typically, LC molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As used herein, the liquid crystals can have a nematic phase, a chiral nematic phase, a smectic phase, a ferroelectric phase, and/or another phase. As a result of the rod-like or disk-like nature, the distribution of the orientation of LC molecules may play an important role in optical applications. In these applications, LC alignment may be dictated by an alignment surface. The alignment surface may be treated so that the LC aligns relative to the surface in a predictable and controllable way. In some embodiments, the alignment surface may ensure a single domain through the LC layer. In other embodiments, the alignment surface may provide many domains and/or many discontinuities. A number of rubbed or photopolymerizable polymers may be used as alignment layers to create polarization gratings described herein. Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in U.S. Pat. No. 7,692,759 to Escuti, et al., the disclosure of which is incorporated by reference herein in its entirety.

It will be understood by those having skill in the art that, as used herein, "polymerizable liquid crystals" may refer to relatively low-molecular weight liquid crystal materials that can be polymerized, and may also be described herein as "reactive mesogens". In contrast, "non-reactive liquid crystals" may refer to relatively low-molecular weight liquid crystal materials that may not be polymerized.

Also, as used herein, "zero-order" light propagates in a direction substantially parallel to that of the incident light, i.e., at a substantially similar angle of incidence, and may be referred to herein as "on-axis" light. In contrast, "non-zero-order light," such as "first-order" light, propagates in directions that are not parallel to the incident light, and is referred to herein as "off-axis" light. "Partially collimated" light, as described herein, may describe light rays or beams that propagate substantially parallel to one another, but may have some divergence (e.g., difference in beam diameter with distance from the source). In contrast, "perfectly collimated" light may describe light rays or beams that have no divergence.

It will be understood by those having skill in the art that, as used herein, a "transmissive" or "transparent" substrate may allow at least some of the incident light to pass therethrough. In other words, transmissive or transparent elements described herein need not be perfectly transparent, and may absorb some of the incident light. A transparent substrate may be a glass substrate in some embodiments. In contrast, a "reflective" substrate as described herein may reflect at least some of the incident light.

Embodiments of the present invention may arise from recognition that several problems with traditional PCS approaches may be attributed to the polarization-separating element. In particular, while several approaches may employ an array of small polarizing beam-splitters (also referred to as a PBS array), such approaches may experience substantial degradation in efficiency for light that is incident at larger angles (also referred to herein as "off-axis" light) with respect to the optical axis of the PBS array, beginning at ±5°. This degradation in efficiency is limited in large part by the polarization splitting or separating element (i.e., the PBS-array). As many light sources may emit light beyond these angles, this presents a practical limitation. The PBS-array may also present challenges in fabrication, and multiple individual elements may be challenging to align with the needed precision.

Some embodiments of the present invention provide a configuration of optical elements, also referred to herein as a polarization conversion system (PCS), that accept unpolarized incident light (e.g., input light with diverse and unpredictable polarization) at a wider range of angles, and converts this unpolarized light into light having a substantially same or a single desired polarization with a conversion efficiency of greater than about 50%, and in some embodiments, greater than about 90%. Embodiments of the present invention can be used, for example, in projection and direct-view display systems, where most light sources are (at best) partially-polarized and partially-collimated.

In particular, embodiments of the present invention employ a polarization grating, among other elements, to convert unpolarized incident light to be nearly fully polarized, with very little loss, and can be implemented to be easily integrated into an optical system. The polarization grating re-directs an on-axis beam into two divergent beams of approximately equal intensity, such that most (e.g., greater than about 95%) of the incident light intensity is contained in the two beams. As such, the polarization grating alters the polarization state and alters the direction of propagation of the incident light (e.g., the grating polarizes and diffracts the incident light), with high efficiency. The polarization grating may be a birefringent material with a periodic, spatially varying local optical axis, and may be formed using a holographic patterning process.

Polarization gratings (PGs) according to some embodiments of the present invention may be transparent, thin-film, beam-splitters that periodically alter both the local polarization state and propagation direction of light traveling therethrough. For example, the PG may split unpolarized light into two orthogonal circular polarizations with high efficiency (about 95% to 99%), for fairly large incident angles and wide bandwidths. In contrast, conventional linear polarizers may operate by converting incident light into a single polarization state, permitting light of that polarization state to travel therethrough, but absorbing light of other polarization states. In some embodiments, the PG, the retarder element, elements therebetween, and/or adjacent elements described herein may be implemented using one or more polymerized birefringent liquid crystal layers. In other embodiments, the PG, the retarder element, elements therebetween, and/or the adjacent elements may be implemented using a birefringent liquid crystal layer that is configured to be switched between a first state that does not substantially affect the polarization of light traveling therethrough, and a second state that alters the polarization of the light traveling therethrough (for example, converting the light to its opposite or orthogonal polarization).

Polarization gratings according to some embodiments of the present invention may be diffractive optical elements having a spatially-variant uniaxial birefringence (e.g., $n(x) = [\cos(\pi x/\Lambda), \sin(\pi x/\Lambda), 0]$), and may provide diffraction efficiencies of up to 100%. A polarization grating as described herein may implement a linear phase profile, e.g., $\Phi(x) = \pi x/\Lambda$ or $\Phi(y) = \pi y/\Lambda$, where $\Lambda$ is the constant grating period. The angle Φ defines the local optical axis orientation at the surface of the PG substrate. Polarization gratings as described herein may be similar to the broadband gratings disclosed U.S. Patent Appl. No. 60/912,044 and U.S. Patent Appl. No. 60/912,039, the disclosures of which are incorporated by reference herein; however, the classic narrowband PG (as described for example in U.S. Pat. No. 7,196,758 to Crawford et al.) may be employed in embodiments of the present invention as well.

Figure 1B:
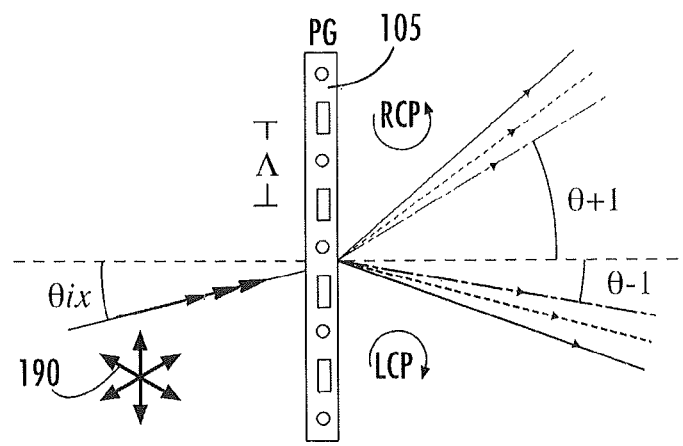
FIG. 1B is a schematic diagram illustrating polarization grating (PG) behavior and geometry in accordance with embodiments of the present invention.

FIGS. 1A and 1B illustrate polarization conversion systems including polarization gratings in accordance with embodiments of the present invention. As shown in FIG. 1B, the output diffraction angle of a PG 105 is governed by the grating equation, $\sin \theta_{\pm 1} = \lambda/\Lambda + \sin \theta_{in}$, where $\lambda$ is the wavelength, $\Lambda$ is the grating period, and $\theta_{\pm 1}$ and $\theta_{in}$ are the first-order diffracted and incidence angles, respectively. The PG 105 can be used to create and separate unpolarized incident light into two beams of orthogonal polarizations, and subsequent elements can be used to convert each of the orthogonal polarizations into a same polarization state.

In particular, as illustrated in FIG. 1A, embodiments of the present invention provide a PCS design 100 that achieves high polarization conversion efficiency (typically in the range of 70-95%) by arranging both the PG 105 and a wave plate or retarder element 115 after a first lens element 110. Unpolarized incident light 190 is concentrated by the lens element 110 and diffracted by the PG 105 into two beams that are focused at respective spots at the focal plane f of the lens element 110. The focal spots correspond to the first-order beams $\theta_{+1}$, $\theta_{-1}$ diffracted by the PG 105. The beams focused at the two spots are circularly polarized, with orthogonal or opposite handedness. For example, as shown in FIG. 1A, the beams focused on the upper spot are right-hand circularly polarized (RCP; shown as solid lines), while the beams focused on the lower spot are left-hand circularly polarized (LCP; shown as dashed lines). The patterned retarder element 115 includes two alternating retardation regions (also referred to herein as 'domains' or 'zones'), and is arranged at the focal plane f of the lens element 110. The retarder element 115 is configured to provide broadband quarter-wave retardation throughout, but provides different optical axes (which are 90 degrees apart) in each of the two zones. More particularly, in FIG. 1A, the upper zone of the retarder element 115 is oriented with its optical axis at +45 degrees to provide a +90 degree retardation or phase shift of the light output from the PG 105, and the lower zone of the retarder element 115 is oriented with its optical axis at −45 degrees to provide a −90 degree retardation or phase shift of the light output from the PG 105. As such, the retarder element 115 converts the two orthogonal circular polarizations into the same polarization 199 (e.g., linear polarization). The PG period A is chosen such that collimated light at or near the center wavelength $\lambda$ (e.g., 550 nm) is diffracted to the center of these two zones. This geometry defines the diffraction angle $\theta_{\pm 1} = \tan^{-1}(D/4f)$, where D is the lens diameter and f is the focal length. The PG period A is calculated using the grating equation $\Lambda = \lambda/\sin(\tan^{-1}(D/4f))$.

Figure 2A:
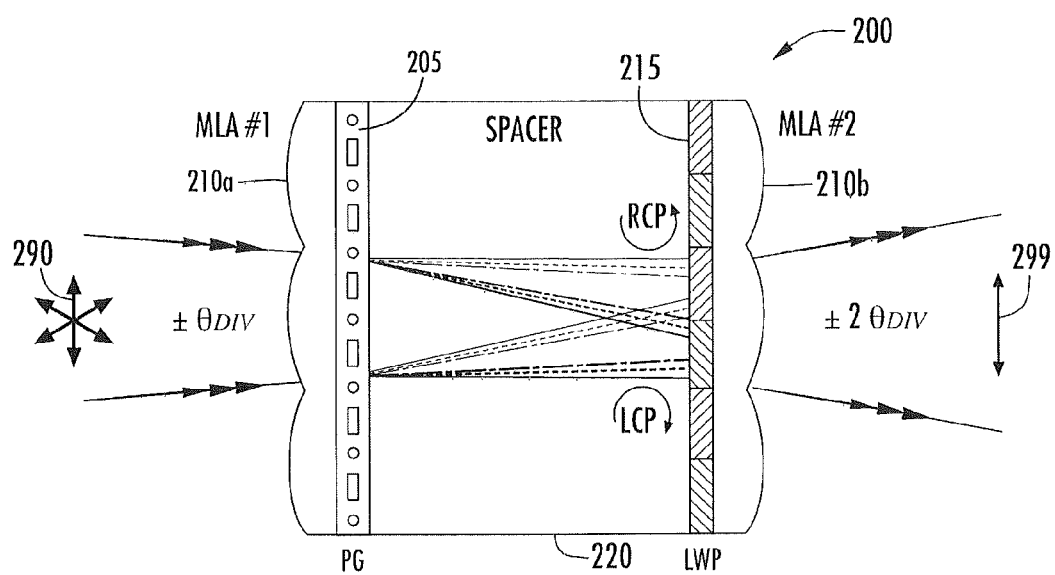
FIG. 2A is a schematic diagram illustrating a monolithic polarization conversion system including a polarization grating, two lens arrays, and a retarder element in accordance with embodiments of the present invention.

Further embodiments of the invention described herein provide a monolithic arrangement including at least one lens array (each having at least two lenslet elements), a polarization grating, and a louvered retarder element or waveplate, which together can convert unpolarized light to polarized light with high conversion efficiency. For example, as shown in the embodiments of FIG. 2A (in cross section) and FIG. 2B (in perspective view), a polarization conversion element 200 includes a first or front multi-lens array 210a, a polarization grating PG 205, a spacer layer 220, a retarder element 215 (shown as a louvered quarter wave plate LWP), and a second or back multi-lens array 210b. The polarization grating PG 205 may be positioned between the first lens array 210a and a focal plane thereof, or at or near the focal plane. The louvered retarder element 215 may be positioned at or near the focal plane of the first lens array 210a and aligned with focal points of the lenslet elements of the first lens array 210a. The polarization conversion element 200 including the polarization grating 205 and retarder element 215 is also referred to herein as a PG-based PCS or "PG-PCS" element.

Figure 2B:
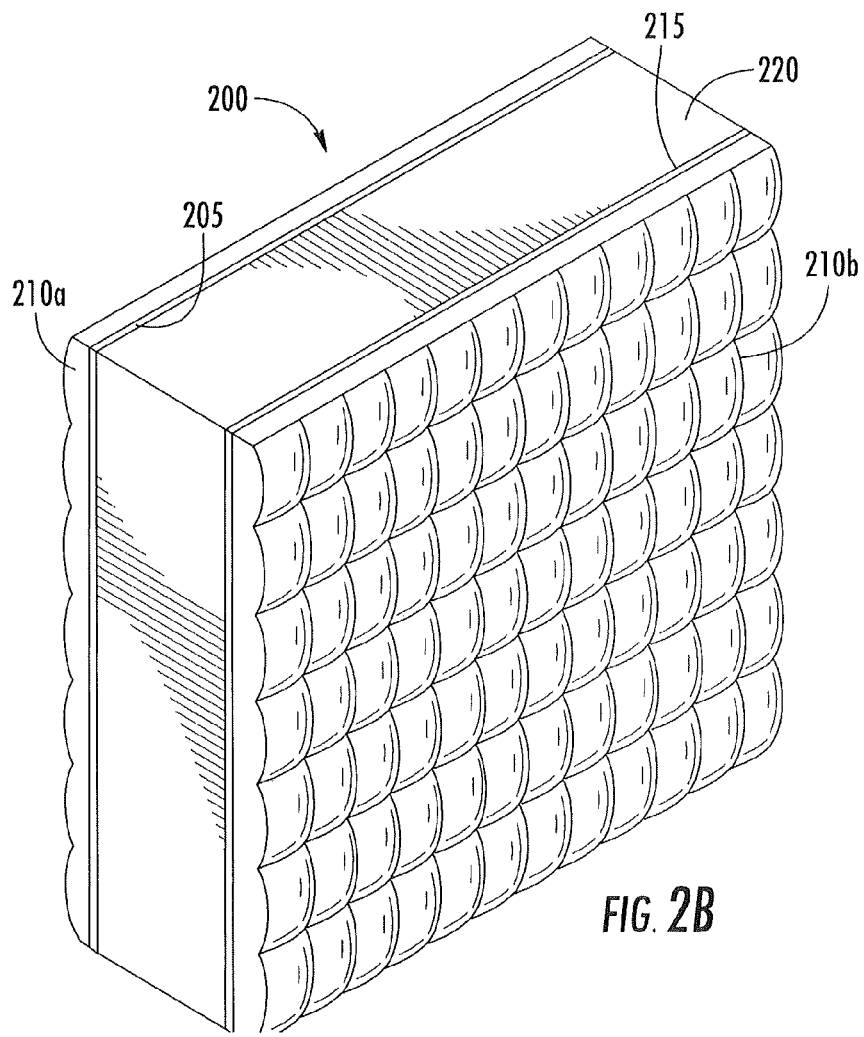
FIG. 2B is a perspective view illustrating the polarization conversion system of FIG. 2A.

Referring to FIG. 2A, unpolarized input light 290 is incident on and received by the first lens array 210a. The first lens array 210a may include about 2 to about 20 or more rows and/or columns of lenslet elements, and about 7 to about 11 rows and/or columns in some embodiments. The incident light 290 may be at least partially collimated, perfectly collimated, or even uncollimated in some embodiments. For example, the input light 290 may be partially collimated within approximately ±20°, and in some embodiments within ±10°, in at least one dimension. In particular embodiments, the input light 290 incident on the first lens array may be collimated within about ±17° to about ±9°. The polarization grating 205 is positioned to receive light output from the first or front lens array 210a, and the retarder element 215 is positioned to receive light output from the polarization grating 205. The combination of the polarization changes effected by the polarization grating 205 and the retarder element 215 provide output light 299 having a same desired polarization state (illustrated as linear polarization), as discussed in greater detail below. The second or back lens array 210b is positioned to receive and direct the output light from the retarder 215 element; however, it will be understood that the second or back lens array may not be used in all embodiments. In FIGS. 2A and 2B, the first and second lens arrays 210a and 210b are similar lens arrays arranged with their convex lens surfaces opposing or facing outward relative to one another. Each of the lenslets of the first and/or second lens arrays 210a and/or 210b may have dimensions (such as a length, width, or diameter) of about 0.5 millimeters (mm) to about 2 mm in some embodiments, and may be square or rectangular in plan view. The spacer layer 220 may be a rigid glass or polymer spacer placed in between the polarization grating 205 and the louvered retarder 215. Additional spacer layers may also be provided between the lens array 210a and the PG 205 (such as layer 220' shown in FIG. 2C), between the spacer layer 220 and the retarder element 215 (such as layer 220" shown in FIG. 2C), and/or between the retarder element 215 and the lens array 210b (not shown).

The monolithic PG-PCS element 200 illustrated in FIGS. 2A and 2B may be implemented, for example, in projection applications. A functional PCS in a projector should be compact, and the output angles may require recollimation. As such, the lens arrays 210a and 210b may be implemented as microlens arrays (MLAs) placed at the input and output, respectively. These MLAs may be two-dimensional (2D) arrays, but may also be one-dimensional (1D) in some embodiments. Each lenslet of the arrays 210a and/or 210b may function in a manner similar to the discrete lens element 110 shown in FIG. 1A, resulting in two orthogonally polarized grids of spots at the focal plane, interspersed but spatially separated (as shown for example in FIG. 2E). The grating period A and/or the focal length f can be selected to improve and/or optimize the polarization conversion, but may be constrained by the divergence of the incident light and limitations on lenslet dimensions (for example, achievable lens curvature, lateral size, and substrate thickness). Approximately complete polarization conversion may occur when the input divergence angle $\pm\theta_{DIV}$ is $<\theta_{\pm 1} = \sin^{-1}(\lambda/\Lambda)$, since there is typically no overlap of each focal plane spot onto its neighboring patterned retarder. However, even when $\pm\theta_{DIV} > \theta_{\pm 1}$ the degradation may be minimal. It is noted that the above equations are approximations, and that optical ray-trace modeling tools may be used to determine improved or optimum designs.

As shown in FIGS. 2A and 2B, the above described layers or elements are arranged, aligned, and laminated together to provide a monolithic element 200. The monolithic polarization conversion element 200 reduces the number of interfaces between layers and alignment requirements, which can improve conversion efficiency and facilitate improved functionality. In particular, the reduced number of interfaces may reduce losses due to interface reflections, and may simplify the alignment of the PCS element 200 into an optical system. In addition, all elements may be laminated together with the non-planar surfaces are facing outward. Also, the monolithic element 200, without additional fixtures, can be easier to integrate in other devices or systems. Thus, not only is conversion efficiency enhanced, but the overall fabrication cost and integration complexity is reduced.

Figure 2C:
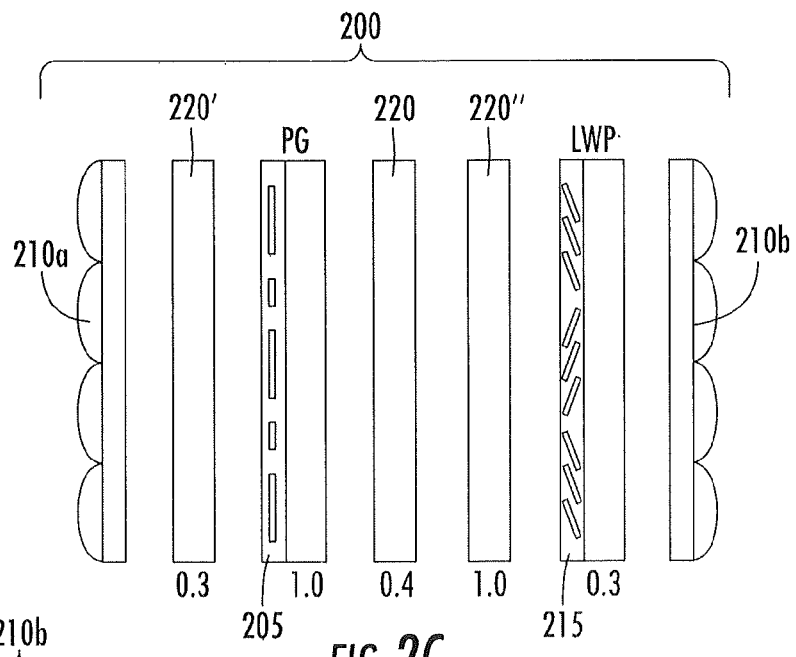
FIG. 2C is an exploded view illustrating the individual elements of FIGS. 2A and 2B prior to lamination together to define the monolithic element in accordance with embodiments of the present invention.

FIG. 2C is an exploded view illustrating the individual elements of FIGS. 2A and 2B that are laminated together to define the monolithic element 200 in accordance with embodiments of the present invention. As shown in the embodiment of FIG. 2C, layers having thicknesses of 1.0 millimeter (mm) and 0.3 mm are used for the polarization grating (PG) 205 and louvered wave plate (LWP) 215, respectively. In particular, the PG 205 and LWP 215 are laminated to 1.0 mm and 0.3 mm glass substrates, respectively, and then diced. After dicing, the PG 205 and LWP 215 are assembled between the first and second lens arrays 210a and 210b with a 0.4 mm glass substrate spacer layer 220 between the PG 205 and LWP 215. Additional transparent spacer layers 220' and 220" may also be provided between the first lens array 210a and the PG 205 and between the PG 205 and the LWP 215, respectively. The second lens array 210b can positioned adjacent or close to the LWP 215 and is registered with the first lens array 210a, in order to both homogenize and re-collimate the output before being relayed by additional optics onto a microdisplay. While illustrated in FIGS. 2A-2C as facing outward (e.g., facing away from each other), it will be understood that the convex surfaces of the first lens array 210a and/or the second lens array 210b may be facing inward/toward the PG 205 and LWP 215 in some embodiments. Furthermore, the second lens array 210b may be different than the first lens array 210a, or may even be omitted altogether in some embodiments. Also, the lens arrays 210a, 210b need not be symmetrical, and can have circular, elliptical, and/or polygonal bases in some embodiments.

Figure 2D:
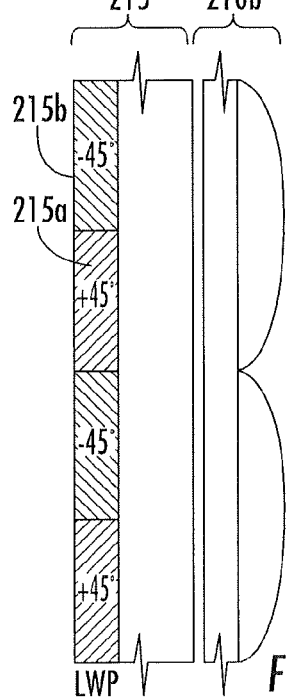
FIG. 2D is an enlarged view of a portion of a louvered retarder element that may be used in the polarization conversion element of FIGS. 2A-C.

FIG. 2D is an enlarged view of a portion of a louvered or patterned retarder element 215 that may be used in the polarization conversion element 200 of FIGS. 2A-C. The patterned retarder element 215 is a birefringent optical element having two or more patterned regions, within each of which the optical axis is constant but different from surrounding regions, designed to alter the polarization state light passing through each the region differently. As shown in FIG. 2D, the patterned retarder element 215 may include two or more alternating retardation regions (also referred to herein as 'domains' or 'zones') 215a, 215b that are positioned side-by-side in a coplanar arrangement. In particular, FIG. 2D illustrates alternating strips of quarter wave retardation, with one strip 215a having an optical axis at +45°, and the other strip 215b having an optical axis at −45°. The louvered retarder 215 can be arranged relative to the second lens array such that each set of alternating domains (+45°, −45°) concentrates light through a same lenslet of the second lens array 210b. In other words, the patterned retarder element 215, also referred to as a louvered wave plate (LWP), has two zones 215a, 215b per lenslet in a single dimension corresponding to the PG diffraction plane in some embodiments. The two zones 215a, 215b provide the same achromatic quarter-wave retardation, but with orthogonal optical axes. With the LWP 215 arranged near the focal plane of the first lens array 210a (e.g., at or near the focal distance f), both grids of orthogonal circular spots (shown in FIG. 2E) are converted into the same linear polarization.

In some embodiments, the retarder element 215 may be implemented using a multi-layer retarder including first and second retarder layers having different twists, as described for example in U.S. Provisional Patent Application No. 61/544,936, the disclosure of which is incorporated by reference herein. In particular, the retarder element 215 may be a stacked structure including first and second chiral liquid crystal layers of opposite handedness. Retarders, such as the louvered retarder 215 described herein, may accomplish a polarization change via optical rotation or birefringence retardation, or any combination thereof, but may not significantly affect or alter the direction of propagation of light passing therethrough. In contrast, polarization gratings, such as the PG 205 described herein, provide diffraction (i.e., changing of the propagation direction) of the light passing therethrough.

Figure 2E:
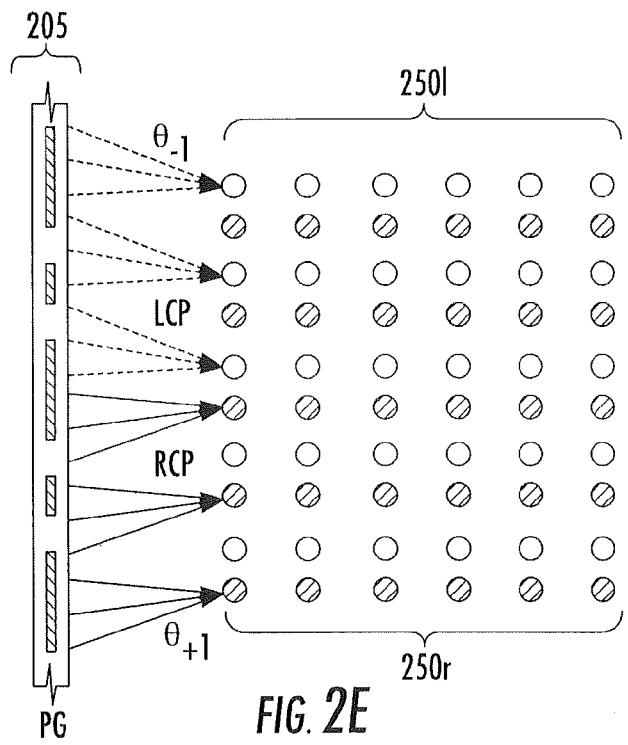
FIG. 2E illustrates the light output from the PG in accordance with embodiments of the present invention prior to being transmitted through the louvered retarder element.

FIG. 2E illustrates the light output from the polarization grating 205 in accordance with some embodiments described herein prior to being transmitted through the louvered retarder element 215. As shown in FIG. 2E, the PG 205 is configured to polarize and diffract the respective beams output from the lenslet elements of the first lens array 210a into divergent first and second polarized beams to define first and second beam grid arrays 250r and 250l of focal spots at the focal plane of the first lens array 210a. The first and second beam grid arrays 250r and 250l are interlaced or spatially offset. The first and second beam grid arrays 250r and 250l may partially overlap in some embodiments, but may be non-overlapping in other embodiments. The first and second beams output from the polarization grating 205 may have orthogonal polarization states. For example, the first beam grid array 250r may be defined by first beams having right-hand circular polarization (RCP; solid lines), and the second beam grid array 250l of focal spots may be defined by second beams having left-hand circular polarization (LCP; dashed lines). The retarder element 215 (positioned at or near the focal plane of the first lens array 210a) may be configured to convert the orthogonal polarization states of the first and second beams of the beam grid arrays 250r and 250l shown in FIG. 2E to a same polarization state. For example, the retarder element 215 may be a louvered quarterwave plate that converts the first beams having right-hand circular polarization and the second beams having left-hand circular polarization output from the polarization grating into light beams having linear polarization 299, as shown in FIG. 2A.

In an example PCS in accordance with the embodiments described herein, the PG 205 and LWP 215 may be fabricated using commercial materials and processing, and custom micro-lens arrays (MLAs) 210a, 210b may be fabricated using traditional methods. For example, in some embodiments, the lens arrays 210a, 210b may be identical MLAs, and may be formed by injection molding of an acrylic molding resin (such as Plexiglas) into a 5-by-9 grid of lenslets, each with 1.4 mm×0.77 mm square dimension and 1.1 mm spherical radius of curvature. A single-layer anti-refection (AR) coating may be applied on the lenslet outer surface. A glass spacer of 1 mm thickness may be used to position the LWP 215 at the focal plane of the first MLA 210a. The PG 205, LWP 215, and glass spacer may be fabricated on 1 inch square substrates, and subsequently diced to match the size of the MLAs 210a, 210b. The elements may then be glued together, for example, using a polarizing optical microscope to register or align the MLAs 210a, 210b and the LWP 215. The resulting monolithic PG-PCS 200 may be about 4 mm thick.

In addition, in some embodiments, one or both of the PG 205 and the LWP 215 may be formed using the material LIA-0001 as a photo-alignment polymer, and using a reactive LC prepolymer mixture RMS10-025 (Δn~0:16) doped with chiral LCs CB-15 and MLC-6247. One or both of the PG 205 and the LWP 215 may be formed on 1 mm thick borosilicate glass substrates, using spin-coating. All elements may be laminated together using the optical adhesive NOA-65. In a particular example as described below, a PG was formed to have about a 3.6 μm period, which may provide a first-order diffraction angle of about ±8.5 degrees at about 530 nm, using UV-laser polarization holography and methods. For example, a photo-alignment layer may be formed on a substrate and patterned using UV-laser holography to define a periodic pattern therein, and a liquid crystal layer may be formed on the patterned photo-alignment layer such that the molecules of the liquid crystal layer are aligned with the periodic pattern in the alignment layer. The liquid crystal layer may then be polymerized to define the PG 205.

Figure 3:
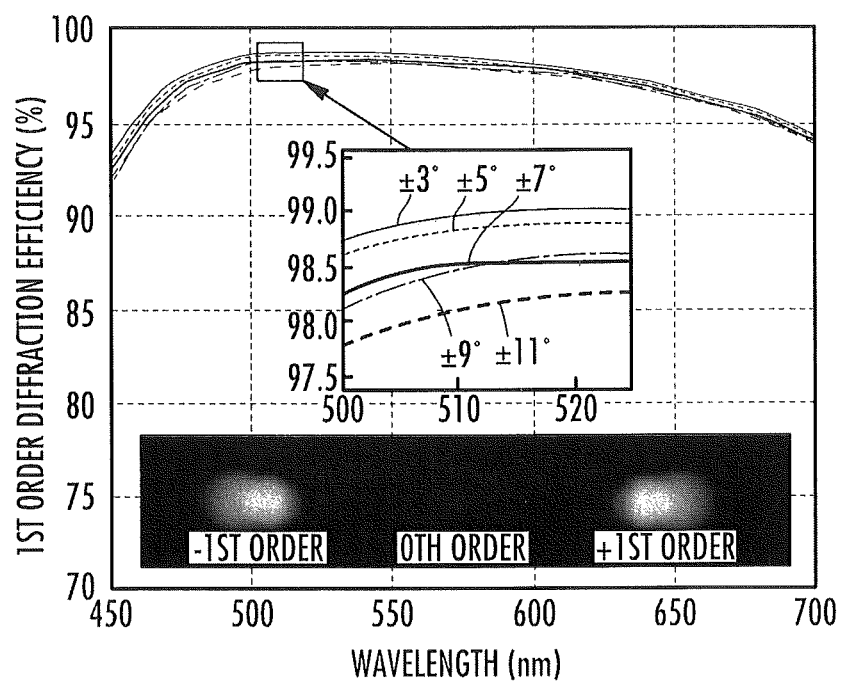
FIG. 3 is a graph illustrating 1st order diffraction efficiency of a PG in accordance with embodiments of the present invention for various input light divergence in the visible range. The inset of FIG. 3 is a photograph illustrating unpolarized, white LED light as diffracted by a PG in accordance with embodiments of the present invention.

Using a polarization grating fabricated in accordance with embodiments of the present invention described herein, the total first-order ($\eta_{+1}+\eta_{-1}$) diffraction efficiency for unpolarized input light was measured for various input divergence angles. In particular, FIG. 3 illustrates the diffraction efficiency for first-order light ($\eta_{+1}+\eta_{-1}$) provided by a PG with a 3.6 μm grating period for input light in the visible range. The inset photograph of FIG. 3 illustrates the light output of an unpolarized, white LED light as diffracted by a PG in accordance with embodiments of the present invention.

As shown in the graph of FIG. 3, the PG provides high diffraction efficiency into the first-order (e.g., greater than about 95%) for incident light having substantial divergence angles (including ±11°). In particular, as shown in the enlarged view provided by the inset graph in FIG. 3, PGs in accordance with embodiments of the present invention can maintain greater than 95% efficiency for input light that is collimated within about ±3°, ±5°, ±7°, ±9°, ±11°, or more. Accordingly, polarization gratings (such as the PGs 105 and 205 described herein) may provide high diffraction efficiency over a greater angular range or wider angular aperture with respect to incident/input light than a PBS array. This wider angular aperture provided by PGs is a reason that PG-based PCS elements as described herein may provide higher throughput than a PBS array-based PCS.

Figure 4:
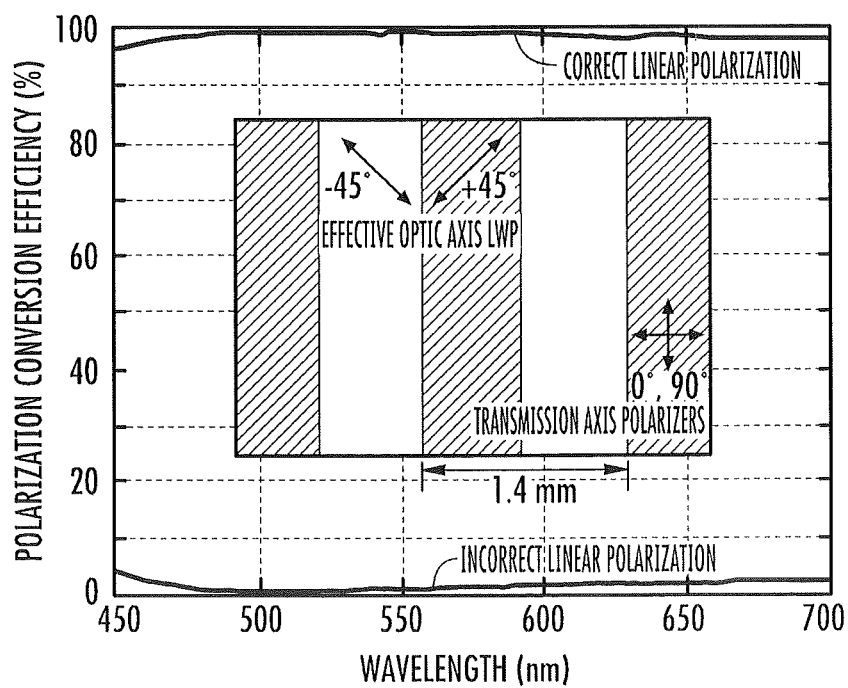
FIG. 4 is a graph illustrating polarization conversion efficiency of a louvered retarder element in accordance with embodiments of the present invention with respect to conversion of circular polarization into linear polarization. The inset of FIG. 4 is a picture illustrating the contrast between the two zones of the louvered retarder element.

FIG. 4 illustrates the polarization conversion efficiency of a LWP configured to convert circular polarization into linear polarization. The inset of FIG. 4 is a picture of the LWP placed between crossed polarizers, where a second non-louvered QWP was inserted between the LWP and polarizer to show the contrast between the two LWP retardation regions/zones (illustrated as darker and lighter zones). The polarization conversion efficiency shown in FIG. 4 was achieved using a LWP containing alternating domains or zones that behave like broadband quarter wave plates (QWPs) with ±45 degree optical axis orientations, which was fabricated using the methods described in U.S. Provisional Patent Application No. 61/544,936.

For example, in some embodiments, the LWP or other retarder may be formed by exposing a photo-alignment material to a UV lamp through a chrome mask with alternating transparent and opaque zones with 0.7 mm width, which is mounted on a translation stage, to pattern the photo-alignment material. This exposure may be a two step process, where a linear polarizer is used to adjust the exposure directions to 0 degrees and 90 degrees when the corresponding zones are exposed. The patterned alignment layer may be coated with first and second LC polymer layers sequentially stacked on top of each other, to define a broadband QWP (also referred to herein as a multi-twist-retarder (MTR)). In particular, the first LC polymer layer may be deposited on the patterned photo-alignment layer such that its molecular structure aligns to the pattern in the photo-alignment layer at the interface therewith, and may then be polymerized. The first LC layer may be a chiral LC layer having a molecular structure that is twisted over a thickness thereof. In the embodiment of FIG. 4, the director orientations of the first LC layer are twisted over a thickness thereof by a twist angle of about −90 degrees. The thickness of the first LC layer was about 1.36 μm. The second LC layer may be similarly deposited on the first LC layer (such that the molecular structure of the second LC layer is aligned with that of the first LC layer at the interface therewith) and polymerized. The second LC layer may be a chiral LC layer of opposite handedness to the first LC layer. In the embodiment of FIG. 4, the director orientations of the second LC layer are twisted over a thickness thereof by a twist angle of about +60 degrees. The thickness of the second LC layer was about 0.83 μm.

Still referring to FIG. 4, circularly polarized input light was transmitted into one of the ±45 degree zones of the LWP, and the fraction of light output with the correct or desired linear polarization (e.g., S-polarization) and incorrect or undesired linear polarization (e.g., P-polarization) was measured. The measured conversion efficiency was substantially the same for both the ±45 zones. As illustrated in FIG. 4, the light output from the LWP is predominantly linearly polarized (with greater than about 97% having the correct polarization, and less than about 3% having the incorrect polarization) over the entire visible range. Similar measurements were obtained using a commercial measurement tool.

Figure 5A:
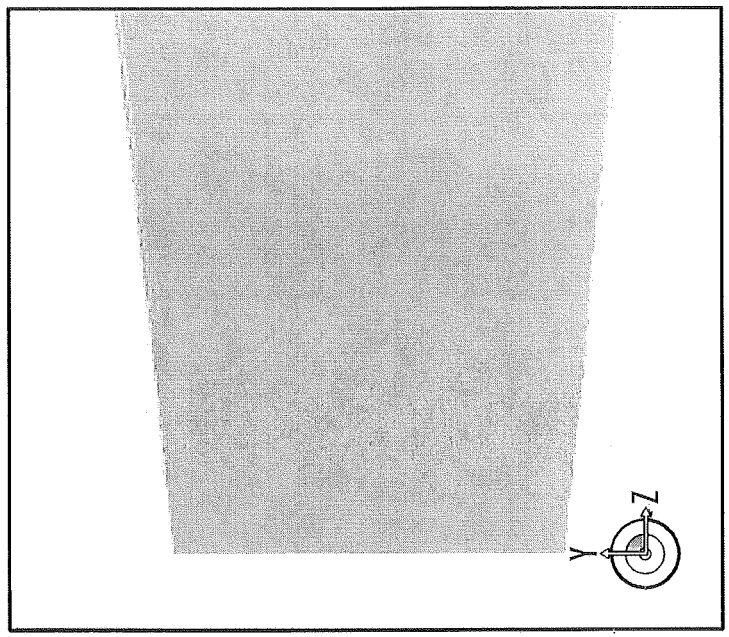
FIGS. 5A and 5B illustrate characteristics of an input light source and the output of a light array, respectively, prior to propagation through a polarization conversion system in accordance with embodiments of the present invention.
Figure 5A:
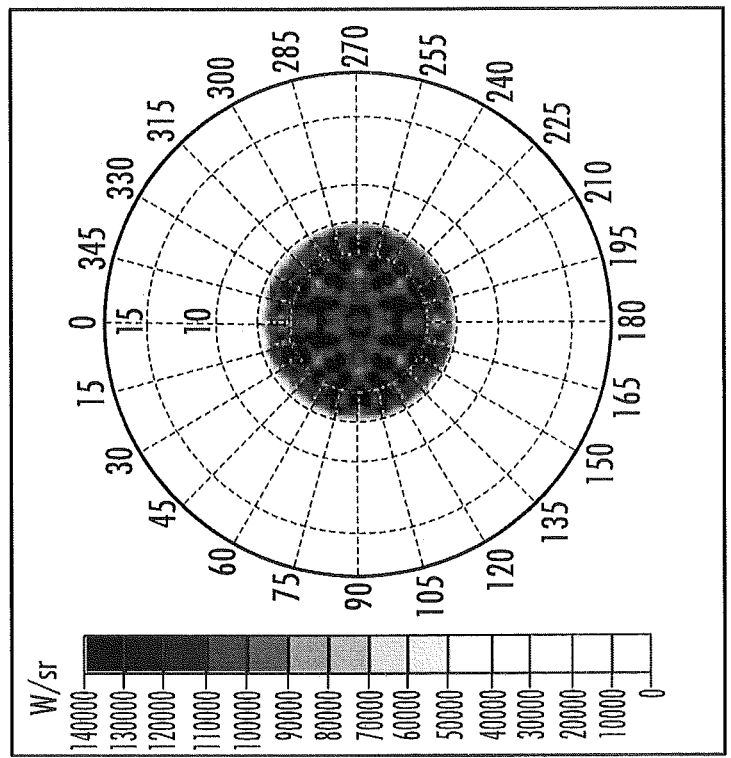
Figure 5B:
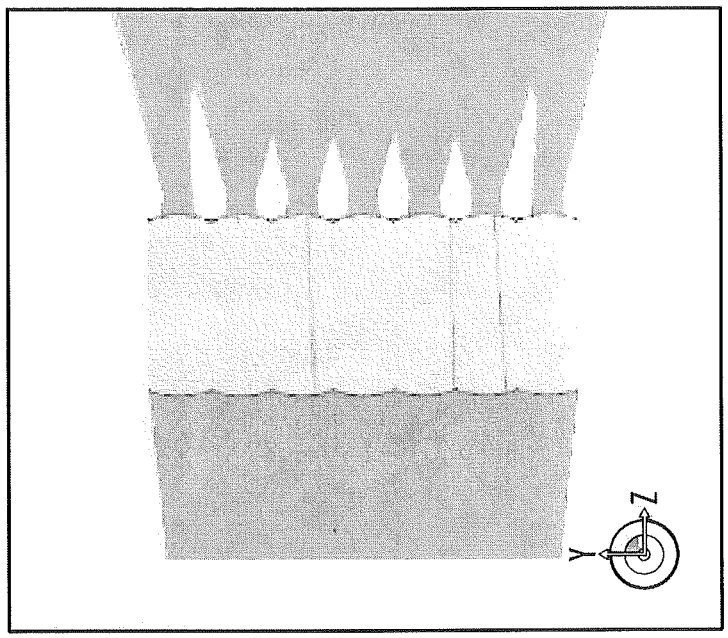
Figure 5B:
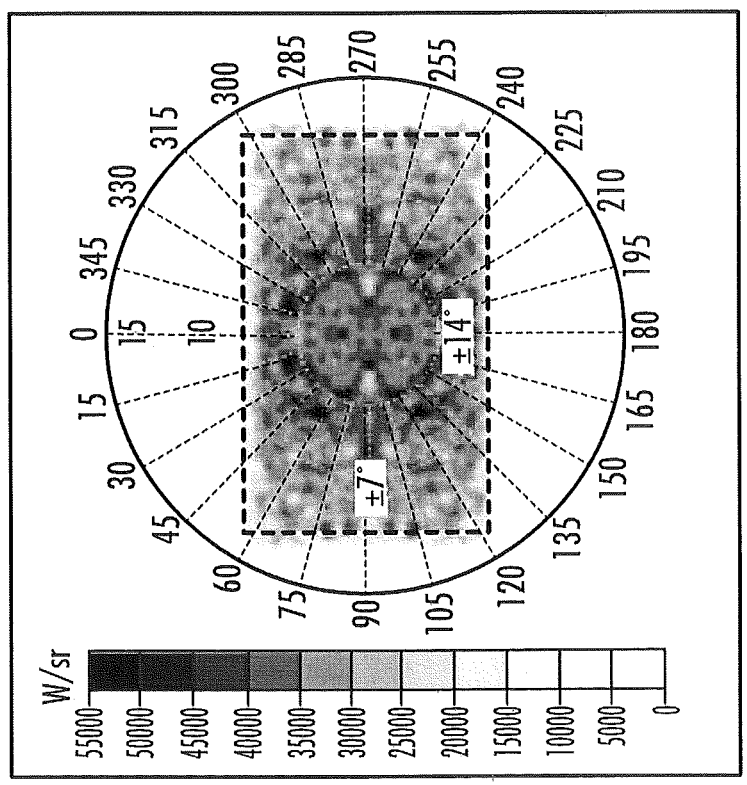

Embodiments of the invention as described above were modeled as illustrated in FIGS. 5A and 5B within a commercial ray-tracing simulation tool, and later assembled and tested experimentally. In FIGS. 5A and 5B, the input side is shown facing left, where unpolarized light enters into the first lens array 210a, followed by the polarization grating 205, then the louvered waveplate 215, and completed in this embodiment by the second lens array 210b at the output on the right side. The first lens array 210a, the polarization grating 205, the spacer layer 220, the louvered waveplate 215, and the second lens array 210b are arranged in such a way that they are optically coupled, or laminated together into one piece, without air interfaces in between the elements. This provides a monolithic PCS element 200, in which all elements are glued or otherwise laminated together, without any additional fixtures, in contrast to some traditional arrangements.

The optical simulation tool was also used to demonstrate the polarization conversion of embodiments of the present invention. In particular, an unpolarized light source with ±7° divergence angle that filled the area of the PCS element 200 at its input face was used. The graphs shown in FIG. 5A illustrate characteristics of this input light source prior to propagation through the PCS elements described herein.

Two identical lens arrays, with a 7×12 grid of lenslets (with 1.25 mm spherical radius of curvature and 1×0.583 mm square dimensions) and single layer anti-reflection coatings were used as the first and second lens arrays. When these two lens arrays are arranged approximately 3 mm apart in registered alignment, and optically laminated with a spacer and with no other optical elements between them, they may define a Fly-Eye-Lens (FEL). FIG. 5B illustrates an example of the output of such an FEL when the light source defined in FIG. 5A is incident on this FEL, without passing through the polarization grating and retarder elements described herein. As shown in FIG. 5B, the output remains the same polarization as the input, with no polarization conversion.

However, in embodiments of the present invention, a polarization grating 205 and louvered wave plate 215 are positioned in between the two lens arrays 210a, 210b, as shown in the examples of FIGS. 2A-2C. The first lens array 210a is configured to focus the light passing therethrough to define an array of focal spots at its focal plane. As the polarization grating 205 is positioned between the first lens array 210a and its focal plane, the polarization grating 205 splits these rays into two interlaced grids of focal spots 250l and 250r, each with orthogonal polarization states, as shown for example in FIG. 2E. The louvered wave plate 215 is positioned at approximately the focal length f of the first lens array 210a, and converts each of the orthogonal polarizations output from the polarization grating 205 to the same polarization state. The second lens array 210b re-collimates the light output from the LWP 215, which is almost entirely linearly polarized, with approximately 90% correct or desired polarization and less than about 4% incorrect or undesired polarization.

Figure 6A:
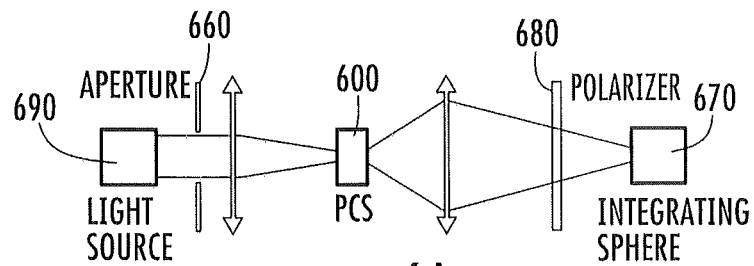
FIG. 6A is a schematic diagram illustrating an optical setup for a polarization conversion system in accordance with some embodiments of the present invention.

FIG. 6A illustrates an example optical setup including a PG-based PCS element 600 in accordance with some embodiments of the present invention. The PCS element 600 may be similar to the PCS element 200 discussed above. As shown in FIG. 6A, broadband unpolarized white light source 690 with controllable divergence angle (for example, of about 3 degrees to about 11 degrees as allowed by aperture 660) provides input light to the PCS element 600. The light output from the PCS 600 is analyzed by a linear polarizer 680 in a rotation mount, and is collected into an integrating sphere 670 connected to a fiber-spectrometer. In the results discussed herein, the absorption of the polarizer 680 itself was normalized out, such that a perfect or lossless PCS would show 100% efficiency, and an empty measurement (no PCS at all) would show 50% efficiency.

Figure 6B:
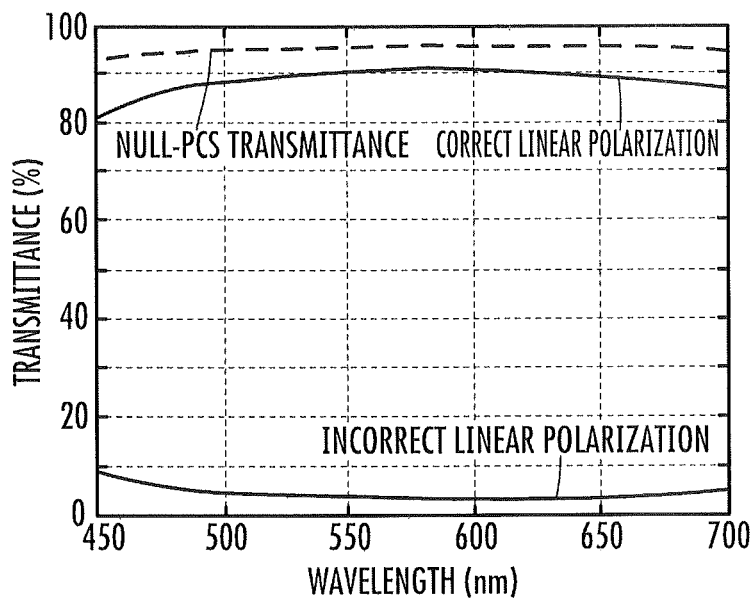
FIG. 6B is a graph illustrating transmittance characteristics of a polarization conversion system in accordance with some embodiments of the present invention.

As shown in FIG. 6B, for light from the input light source 690 having about a ±7 degree divergence angle, the light output from the PCS element 600 contained about 90% correct linear polarization (where "correct" indicates the desired PCS output polarization, e.g., vertical linear) for most of the visible range (about 520-650 nm), and low (less than about 4%) incorrect polarization (where "incorrect" refers to the polarization orthogonal to the desired PCS output, e.g., horizontal linear). The incorrect polarization may typically be removed with a clean-up polarizing optic, such as a PBS cube, or a sheet polarizer. This 90% peak achieved by a PG-based PCS element 600 in accordance with embodiments of the present invention is substantially higher than a conventional PCS with a PBS-array.

Figure 6C:
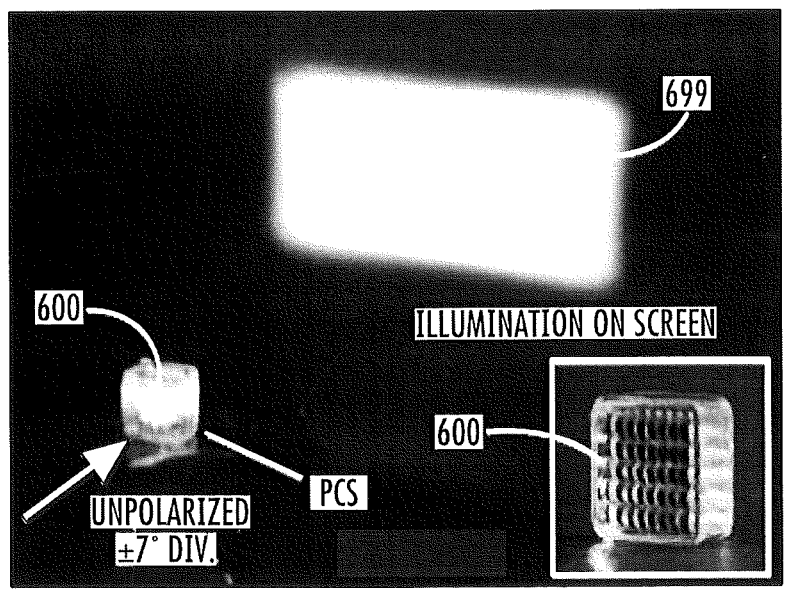
FIG. 6C is a photograph illustrating Illumination of a polarization conversion system in accordance with some embodiments of the present invention on a screen.
Figure 6D:
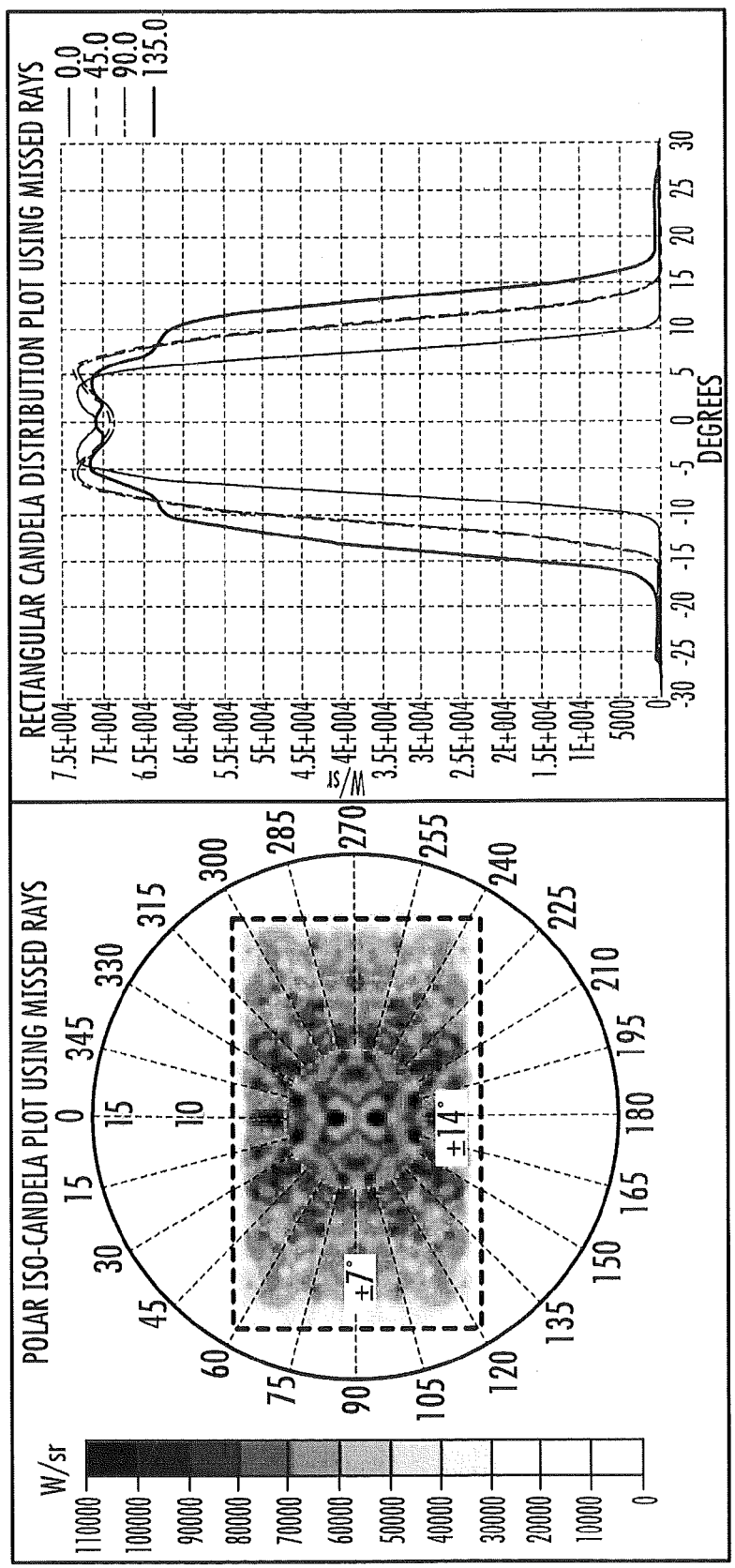
FIG. 6D illustrates the output light profile with the correct polarization of a polarization conversion system in accordance with some embodiments of the present invention.

A photograph of an example PG-based PCS 600 and the output beam 699 therefrom is shown in FIG. 6C. The output beam 699 had about ±7 degree and ±14 degree divergence in the x- and y-directions, respectively, confirming the expected doubling of etendue relative to the input light source, with good brightness and color uniformity. The output light profile with the correct polarization as provided by embodiments of the present invention is illustrated in FIG. 6D in the polar iso-candela plot (left side) and the rectangular candela distribution plot (right side).

Embodiments of the present invention recognize and address several factors that may negatively affect PCS performance. For example, the baseline transmittance of the MLAs may be only 95% (i.e., a null-PCS containing only the glass spacer, and no PG or LWP), due to reflection, absorption, haze, and deflection into larger angles. In addition, the PG and LWP may manifest non-ideal behavior for obliquely incident light (e.g., light having an incidence angle of greater than about ±15 degrees). The PG diffraction efficiency may be reduced as light leaks into the zero-order directions (remaining unpolarized) and/or as the LWP retardation deviates from quarter-wave. Also, the MLA acrylic material itself may manifest some measurable but minor birefringence, which can cause the output polarization to degrade. Furthermore, misalignment in relative positions and orientations of the elements of the PCS can cause losses; in particular the distance between the first MLA and the LWP may be critical. Finally, at larger divergence angles, the first order focal spots at the LWP may begin to overlap with their neighbors, which can further reduce conversion efficiency even though the diffraction efficiency of the PGs may still be high. Improvements in the AR coatings of the MLAs and retardation compensation of the LWP may be effective to improve the conversion efficiency and effective acceptance angle even further.

Figure 7:
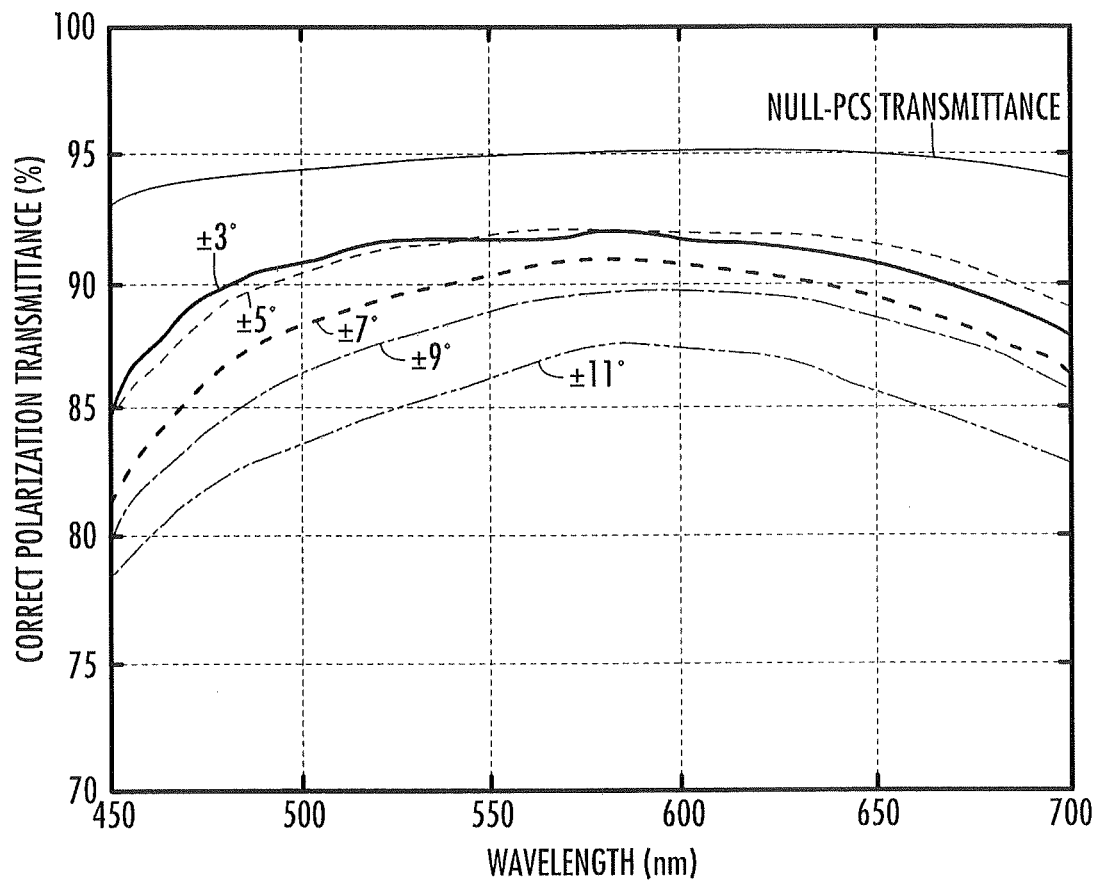
FIG. 7 is a graph illustrating transmittance of the correct polarization for various input divergence angles of a polarization conversion system in accordance with some embodiments of the present invention.

Performance of PG-based PCS elements for various divergence angles $\theta_{DIV}$ is illustrated in FIG. 7 to explore the dependence on angular aperture. The fraction of correct polarization is also shown in FIG. 7. Referring now to FIG. 7, for smaller input divergence angles (e.g., ±3 degrees or ±5 degrees) almost all (e.g., about 92% or more) of the light output from the PG-based PCS has the correct or desired polarization, approaching the null-PCS curve (95%). This may indicate that the individual elements are well-aligned, and the difference between the two may be explained by some combination of the LWP incorrect polarization conversion (as shown in FIG. 4) and a small zero-order leakage of the PG (as shown in FIG. 3). For larger divergence angles (e.g., ±9 degrees or ±11 degrees), some degradation occurs, likely due to the larger oblique incidence on the PG and LWP. However, FIG. 7 illustrates that the polarization conversion of a PCS in accordance with embodiments of the present invention is still high (about 80% to about 87%) even at input divergence angles of about ±11 degrees or more.

In the above non-limiting examples, the beams output from the polarization grating are orthogonal circularly polarized (e.g., RCP and LCP), and are each converted to linear polarization by a louvered wave plate LWP which has optical axes of adjacent retardation regions or louvers 90° apart, such as the example louvered retarder element 215 shown in FIG. 2D. However, it will be understood that, in some embodiments, a monodomain quarterwave retarder can be arranged to receive the light output from the polarization grating to first convert it to orthogonal linear polarizations, and the louvered waveplate may be positioned to receive the light output from the monodomain quarterwave retarder. Such a louvered waveplate may include alternating regions or louvers, one of which is a halfwave retarder, and the other of which is left empty without any birefringent element. Other arrangements and/or combinations of monodomain and louvered waveplates can be positioned to receive the two interposed orthogonally polarized grids of spots and output a single or nearly single polarization state in accordance with embodiments of the present invention. More generally, while discussed above with reference to a particular combination of elements that are arranged to convert unpolarized input light to output light having the same linear polarization, it will be understood that embodiments of the present invention include other arrangements that convert input light with diverse and/or unpredictable polarizations into light having any desired polarization.

In the embodiments of the present invention described herein, the PG is arranged after a first lens array and possibly before a second lens array, somewhat similar to being inside the FEL itself. This arrangement of the invention can improve performance, manufacturability, and ease of integration into optical systems relative to traditional PCS arrangements, especially those that do not provide a single monolithic element with the layers laminated together.

In some embodiments, the PCS element 200 described above can be arranged within a liquid crystal (LC) projector. In particular, the LC projector may include an LED light source or lamp, arranged to provide the unpolarized light as an input to the PCS element 200, followed by a polarizing element, such as a sheet polarizer or PBS cube (e.g., MacNeille or other), followed by a reflective or transmissive LC microdisplay onto which the light is directed, and followed by a projection lens positioned and aligned to receive the light output from the microdisplay as input light. It will be understood that this is a non-limiting example, and that many combinations of the polarizing element, microdisplay, and projection lens can be used with the PCS element described herein. More generally, a reflective or transmissive projection display can include a broadband light source that provides partially collimated light as input light to the PCS element described herein, an optional polarizing element, a microdisplay, and a projection lens.

Figure 8A:
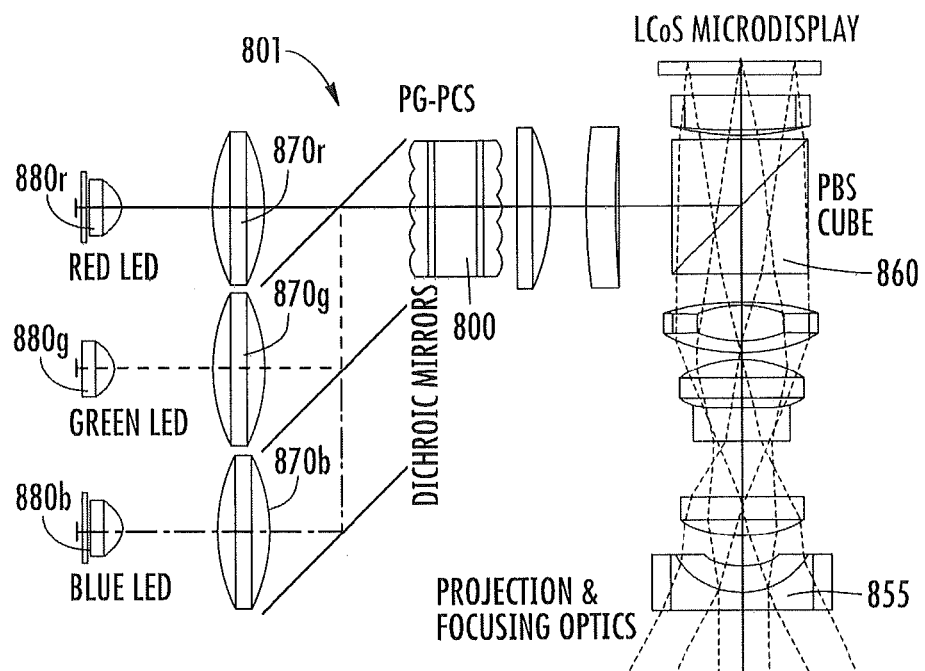
FIG. 8A is a schematic diagram illustrating a layout of a prototype pico-projector including of a polarization conversion system in accordance with some embodiments of the present invention.
Figure 8B:
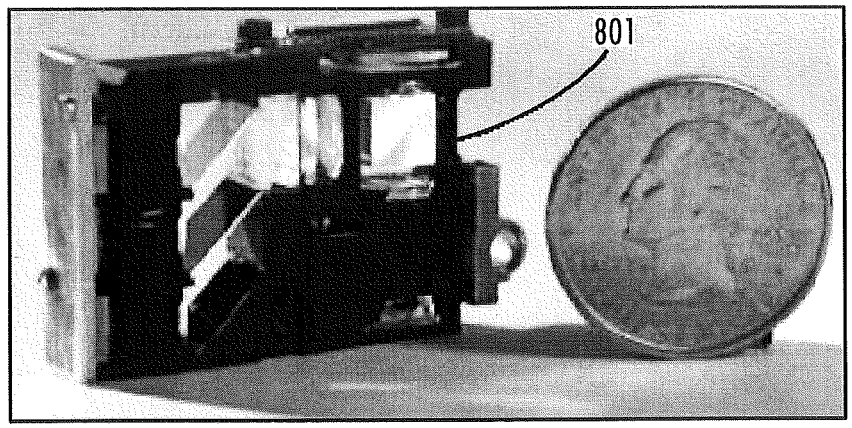
FIG. 8B is a photograph of the pico-projector of FIG. 8A.

To demonstrate the effectiveness of a PG-based PCS in accordance with embodiments of the present invention within a display system, FIGS. 8A and 8B illustrate an example of a prototype pico-projector 801 including a PG-based PCS element 800 (similar to the PG-PCS 200 described above). As shown in FIG. 8A, light from 3 LEDs 880r, 880g, 880b is combined by respective dichroic mirrors 870r, 870g, 870b, relayed into a PBS cube 860, and directed onto a WVGA (854×480) LC on Silicon (LCoS) microdisplay 855. The PG-PCS 800 is positioned before the PBS cube 860, with only slightly different parameters than those described above (i.e., shorter MLA focal length and smaller PG period). The pico-projector 801 showed a high efficacy of 12 lm/W, 10 lm brightness at 0.83 W, along with a 200:1 contrast ratio (full-on-full-off), at 60 Hz full color frame rate. As shown in FIG. 8B, the 'box' volume of the entire projector 801 may be about 6.2 cm$^3$, with a thickness of about 6.8 mm.

Figure 8C:
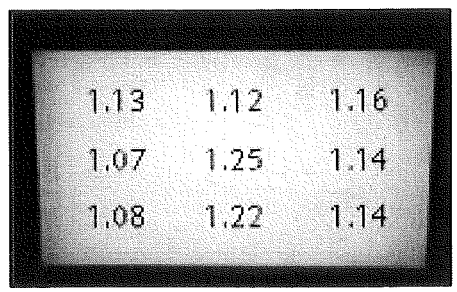
FIG. 8C is a photograph of an image projected by the pico-projector of FIG. 8A, which indicates relative luminance values of the projected image.

Embodiments of the present invention may allow for good brightness uniformity of the projected images. FIG. 8C is a photograph of an image produced by the pico-projector 801. As shown in FIG. 8C, the 3×3 array of numbers indicate relative luminance values at those positions within the image, showing a uniformity ratio of about 86% (based on the minimum luminance relative to the maximum luminance of the image) for white and all colors individually, and standard deviation of 0.064.

For comparison, a commercial pico-projector (Sony Camcorder HDR-PJ260V) was measured in a similar manner, and provided 9±1 lumens per Watt (lm/W) efficacy, 11 lm brightness, 250:1 contrast, nHD (640×360) resolution. Most notably, the commercial pico-projector provided a uniformity ratio of about 57% and standard deviation of 0.29, producing an image dramatically less uniform to an observer. The pico-projector 801 according to embodiments of the present invention also compares favorably to a prior PG-based PCS projector, which provided 9 lm/W efficacy, 9 lm brightness, and about 70% uniformity within 10 cm$^3$.

To isolate the effect of the PG-PCS itself, the PG-PCS was replaced with a null-PCS, which resulted in a reduction in brightness to about 6.1 lm, showing that the PG-PCS 800 in accordance with embodiments of the present invention enhanced the brightness by a factor of about 1.64. This suggests that the PG-PCS in this particular projector performed with 82% polarization conversion, including the photopic weighting, similar to the radiometric curves in FIG. 7.

In summary, a PG-based polarization conversion system in accordance with some embodiments of the present invention enabled the pico-projector prototype 801 to perform extremely well, producing a more uniform image in a smaller volume and with substantially higher efficacy than some traditional PCS. A PG-based PCS in accordance with embodiments of the present invention can also be used with similar benefits within larger LC projectors, and can be adapted into back/front-lights for any display using polarized light.

For example, in some embodiments, the PG-PCS element 200 described above can be arranged within a direct-view LCD television/monitor in its backlight unit (BLU). The PG-PCS element 200 may be positioned adjacent to a light-emitting element (e.g., LED or lamp) to convert the unpolarized light output from the light-emitting element into light having a desired polarization and provide the light having the desired polarization to the BLU waveguide. In some embodiments, the PG-PCS element 200 may be arranged between the LEDs and the waveguide in an edge-lit BLU.

In some embodiments, the PG-PCS element 200 described above can be combined with light from and to optical fibers, to accomplish a similar purpose of accepting light with diverse and unpredictable polarization and converting the light into a single desired polarization. In telecommunication systems, naturally present light with diverse polarizations, which can be quantified as polarization mode dispersion (PMD), can lead to loss, lower communication bandwidths, and/or increased complexity and cost. Accordingly, infrared light from a single-mode or multi-mode optical source (such as an optical fiber) may be directed through and expanded by a collimator and then arranged to pass through the PG-PCS element 200 described above. The PG-PCS element 200 may be used to convert the incident light to a known, uniform, and fixed polarization, which may then be directed into various subsequent components used in telecommunications, including amplifiers, attenuators, filters, or a second collimator into a second optical fiber.

Accordingly, embodiments of the present invention provide a PG-based PCS that converts unpolarized to linearly polarized light with high efficiency. It is based on a broadband PG that angularly separates incident light into divergent beams having orthogonal circular polarizations, while a LWP converts each beam to the same linear polarization, where both the PG and the LWP are arranged in-between two MLAs and laminated. PG-based PCS elements in accordance with embodiments of the present invention can provide greater than about 90% peak conversion efficiency for input light having a divergence of about ±7 degrees, and 80-87% for input light having a divergence of about ±11 degrees. The PG-PCS is a compact and easily-aligned monolithic element, in contrast to some prior approaches. The PG-PCS was implemented in a pico-projector, resulting in 12 lm/W luminous efficacy, 10 lm brightness, class-leading image uniformity, and 6.2 cm$^3$ volume, which demonstrates the high efficiency benefits of the PG-PCS.

PG-PCS elements in accordance with embodiments of the present invention may thus provide higher efficiency, with reduced thickness, fewer component layers, and increased ease in fabrication and handling, allowing for a, simpler and less expensive device. Furthermore, the PG-PCS elements described herein may rely on diffractive splitting elements, thereby avoiding the boundaries between the different regions of the splitting elements that may be used in some prior approaches.

Although illustrated by way of example in several embodiments herein as including first and second lens arrays, it will be understood that the second lens array positioned to receive the light that is output from the retarder element can be omitted in accordance with some embodiments described herein. Also, anti-reflection coatings may be applied on one or more surfaces that interface with the ambient medium (e.g., air) in accordance with embodiments of the present invention.

It will be understood that, as described herein, the terminology "retarder element", "retarder", and "retardation plate" may be used interchangeably to refer to any birefringent plate, including homogeneous waveplates. Such birefringent plates may also be uniaxial, biaxial, or inhomogeneous. Retarders as described herein may be broadband (i.e., achromatic) or narrowband (i.e., chromatic). Retarders as described herein may therefore accomplish a polarization change via optical rotation or birefringence retardation, or any combination thereof, but may not significantly affect or alter the direction of propagation of light passing therethrough.

It should also be understood that, while described above primarily with reference to unpolarized input light, in some embodiments the light incident on the first lens array can be elliptically polarized or partially polarized light (e.g., such as that provided by some laser diodes and/or LED light sources).

Also, as mentioned above, it will be understood that, in some embodiments, monodomain waveplates can optionally be arranged before or after the PG and employed in combination with the louvered waveplate to accommodate or match any desired polarization, aside from those described above.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A polarization conversion system, comprising:
   a lens element;
   a polarization grating having a spatially-varying local optical axis in a direction along a surface thereof and arranged to receive light that is output from the lens element; and
   a retarder element arranged to receive polarized light of first and second different polarization states that is output from the polarization grating and change both the first and second different polarization states to a same polarization state.

2. The system of claim 1, wherein the lens element comprises a lens array having at least two lenslet elements positioned side-by-side in a coplanar arrangement, and wherein the polarization grating is positioned between the lens array and a focal plane thereof.

3. The system of claim 2, wherein the retarder element includes two or more sets of alternating retardation regions positioned side-by-side in a coplanar arrangement and aligned with the respective lenslet elements of the lens array.

4. The system of claim 3, wherein the retarder element comprises a quarterwave plate wherein optical axes of the alternating retardation regions are about 90° apart.

5. The system of claim 3, wherein the lens array comprises a first lens array, and further comprising:
   a second lens array having at least two lenslet elements positioned side-by-side in a coplanar arrangement,
   wherein the second lens array is positioned adjacent the retarder element to concentrate light output from each set of the alternating domains through a respective lenslet element of the second lens array.

6. The system of claim 5, wherein the second lens array is configured to collimate the light output from the retarder element to provide light output from the polarization conversion system that includes about 80% or more linear polarization.

7. The system of claim 5, further comprising:
   a transparent spacer element positioned between the polarization grating and the retarder element, between the first lens array and the polarization grating, and/or between the retarder element and the second lens array.

8. The system of claim 7, wherein the first lens array, the polarization grating, the spacer element, the retarder element, and the second lens array are laminated to provide a monolithic optical element.

9. The system of claim 5, wherein the system is included in a projector comprising:
   a light source configured to provide at least partially collimated light incident on the first lens array;
   a microdisplay arranged to receive light output from the second lens array; and
   a projection lens arranged to receive the light output from the microdisplay as incident/input light.

10. The system of claim 5, wherein the system is included in a backlight unit of a direct view display comprising:
    a light emitting element configured to provide unpolarized light incident on the first lens array; and
    a waveguide arranged to receive light output from the second lens array.

11. The system of claim 2, wherein:
    the polarization grating is configured to diffract respective beams output from the lenslet elements into first and second beams of orthogonal polarization states to define first and second spatially offset arrays of focal spots at the focal plane of the lens array; and
    the retarder element is positioned at the focal plane of the lens array and is configured to convert the orthogonal polarization states of the first and second beams to a linear polarization state without substantially altering respective directions of propagation thereof.

12. The system of claim 1, wherein the polarization grating is configured to output the polarized light comprising divergent beams having orthogonal circular polarization states of opposite handedness.

13. The system of claim 12, wherein the divergent beams include greater than about 90% of an intensity of light that is incident on the lens array.

14. The system of claim 13, wherein the light that is incident on the lens array has a divergence angle of about ±5° or more.

15. The system of claim 13, wherein the light that is incident on the lens array has a divergence angle of about ±10° or more.

16. The system of claim 1, wherein the retarder element includes at least one chiral liquid crystal layer.

17. The system of claim 16, wherein the at least one chiral liquid crystal layer comprises first and second chiral liquid crystal layers having respective molecular orientations that are rotated by different twist angles over respective thicknesses thereof, wherein at least one of the twist angles is non-zero.

18. The system of claim 1, wherein the system is included in a telecommunications system, comprising:
   an infrared light source configured to provide infrared light incident on the lens element; and
   an optical element configured to receive light output from the retarder element.

19. A method of fabricating a polarization conversion system, the method comprising:
   providing a lens element, a polarization grating having a spatially-varying local optical axis in a direction along a surface thereof, and a retarder element; and
   arranging the lens element, the polarization grating, and the retarder element such that the polarization grating receives light that is output from the lens element, and such that the retarder element receives polarized light of first and second different polarization states that is output from the polarization grating and changes both the first and second different polarization states to a same polarization state.

20. The method of claim 19, wherein the lens element comprises a lens array having at least two lenslet elements positioned side-by-side in a coplanar arrangement, and wherein arranging the polarization grating comprises:
   positioning the polarization grating between the lens array and a focal plane thereof.

21. The method of claim 20, wherein the retarder element includes two or more sets of alternating retardation regions positioned side-by-side in a coplanar arrangement, and wherein arranging the retarder element comprises:
   positioning the retarder element at the focal plane of the lens array; and
   aligning the respective sets of alternating retardation regions with the respective lenslet elements of the lens array.

22. The method of claim 21, wherein the retarder element comprises a quarterwave plate wherein optical axes of the alternating retardation regions are about 90° apart.

23. The method of claim 20, wherein the lens array comprises a first lens array, and further comprising:
   positioning a second lens array adjacent the retarder element, the second lens array having at least two lenslet elements positioned side-by-side in a coplanar arrangement such that light output from the respective sets of the alternating domains is concentrated through respective lenslet elements of the second lens array.

24. The method of claim 23, further comprising:
   providing a transparent spacer element between the polarization grating and the retarder element, between the first lens array and the polarization grating, and/or between the retarder element and the second lens array.

25. The method of claim 24, further comprising:
   laminating the first lens array, the polarization grating, the spacer element, the retarder element, and the second lens array to provide a monolithic optical element.

26. The method of claim 19, wherein the retarder element includes at least one chiral liquid crystal layer.

27. The device of claim 1, wherein the polarization grating is free of a boundary between regions thereof.

28. The device of claim 1, wherein the polarization grating comprises a diffractive element that is free of refraction therein.

* * * * *